(12) United States Patent
Hosono et al.

(10) Patent No.: US 7,062,060 B2
(45) Date of Patent: Jun. 13, 2006

(54) OUTER MIRROR AND INTERPHONE FOR A VEHICLE

(75) Inventors: Masami Hosono, Aichi-ken (JP); Masakazu Aoki, Aichi-ken (JP); Tadashi Ejiri, Aichi-ken (JP); Takashi Ichikawa, Aichi-ken (JP); Terumasa Suyama, Aichi-ken (JP); Masao Ayabe, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 394 days.

(21) Appl. No.: 10/356,928

(22) Filed: Feb. 4, 2003

(65) Prior Publication Data

US 2003/0147542 A1 Aug. 7, 2003

(30) Foreign Application Priority Data

Feb. 7, 2002 (JP) .............................. 2002-031175

(51) Int. Cl.
 *H04R 25/00* (2006.01)
(52) U.S. Cl. ..................... 381/389; 381/86; 455/350
(58) Field of Classification Search ............... 381/86, 381/302, 334, 336, 365, 389; 455/350; 359/871
See application file for complete search history.

(56) References Cited

U.S. PATENT DOCUMENTS

| | | | | |
|---|---|---|---|---|
| 3,950,701 | A | * | 4/1976 | Matuoka et al. ............ 455/345 |
| 4,326,100 | A | * | 4/1982 | Polacsek ..................... 381/389 |
| 4,445,228 | A | * | 4/1984 | Bruni ......................... 381/302 |
| 4,768,870 | A | | 9/1988 | Chen |
| 6,243,003 | B1 | * | 6/2001 | DeLine et al. .............. 381/365 |
| 2002/0025049 | A1 | * | 2/2002 | Azima et al. ................ 381/389 |

FOREIGN PATENT DOCUMENTS

JP 04-358936 12/1992

\* cited by examiner

*Primary Examiner*—Suhan Ni
(74) *Attorney, Agent, or Firm*—Nixon Peabody LLP

(57) ABSTRACT

An outer mirror and a vehicle interphone are provided for transmitting a sound to the outside from a vehicle cabin and vice versa. Sound outside the vehicle cabin is transmitted to the cabin from a microphone-loudspeaker provided in a visor cover of the outer mirror. The microphone-loudspeaker is supported on a frame having higher rigidity than the visor cover, which is mounted to a vehicle body via an electric accommodating unit and a door mirror base to promote shock resistance. The visor cover includes a sound-conducting opening in its bottom portion, and the microphone-loudspeaker is made waterproof to promote weather resistance.

13 Claims, 3 Drawing Sheets

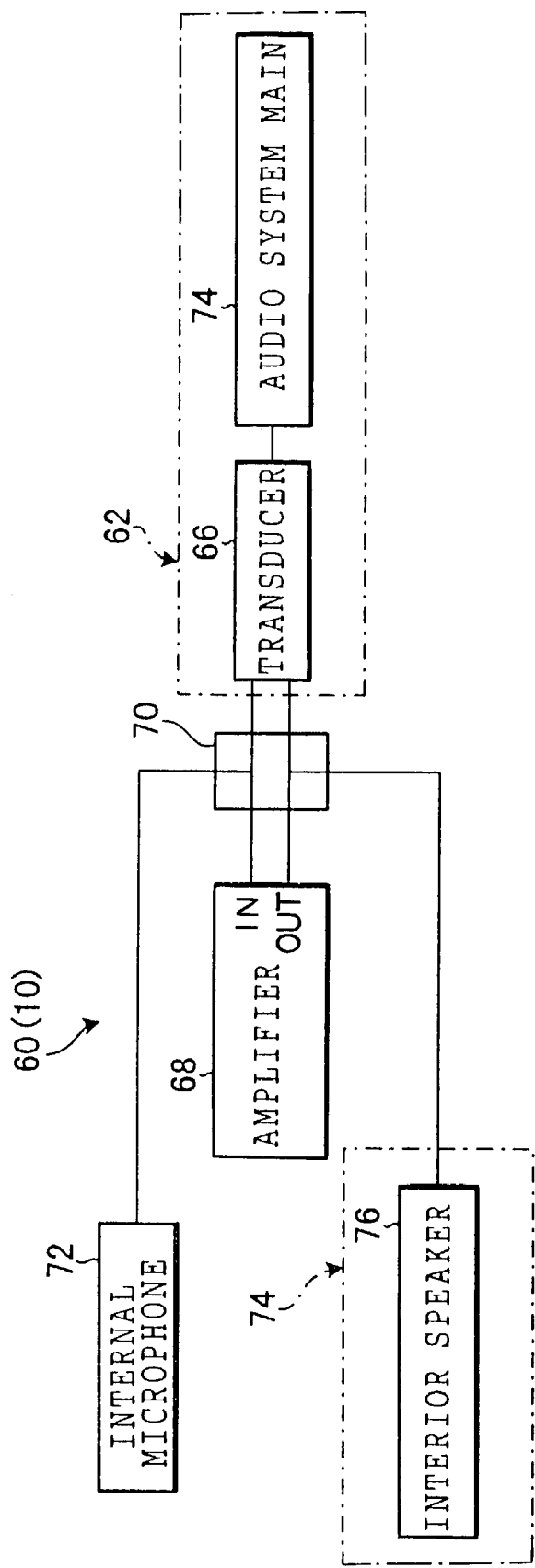

OUTER MIRROR AND INTERPHONE FOR A VEHICLE

BACKGROUND OF THE INVENTION

1. Field of the Invention

The present invention relates to an outer mirror such as a door mirror provided to a door panel of a vehicle. The invention particularly relates to an outer mirror provided with a function of outputting a sound to the outside of a cabin of the vehicle or inputting a sound on the outside of the cabin of the vehicle. Moreover, the invention relates to an interphone for a vehicle for a smooth conversation between persons in and outside the cabin of the vehicle.

2. Description of the Related Art

Normally, when a conversation takes place between a vehicle passenger and a person on an outside of a cabin of a vehicle, basically, a door of the vehicle is opened or a window is opened.

However, a person who speaks to the vehicle passenger from outside the cabin of the vehicle may not necessarily be a person whom the passenger knows, for example. Moreover, considering the possibility that a person on the outside the cabin of the vehicle may speak to the passenger while intending to do harm or bearing ill will, the passenger preferably opens the window or the door after personally confirming that the person is not intending to do the passenger harm.

On the other hand, if the door panel and the window are kept closed, sound on the outside of the cabin of the vehicle is hard to hear and a smooth conversation is impossible.

As an example of means for solving the above problems, provision of a system similar to a so-called interphone used for a house or the like to a vehicle can be considered. Such an interphone system is applied to a vehicle such as a bus in recent years and achieves a smooth conversation between a person waiting to get on in a vicinity of a door for getting on and off of the bus and a driver in a driver's sheet by mounting a microphone and a loudspeaker to a vehicle body at a central portion in a longitudinal direction of the vehicle or in the vicinity of the door for getting on and off on a rear end side.

However, it is extremely difficult to mount the loudspeaker and the microphone of the above interphone system to a vehicle body of a vehicle such as a sedan and a coupe which is much smaller than a bus vehicle in consideration of a space for mounting.

Therefore, mounting of the loudspeaker and the microphone to an inner peripheral portion of a visor of a door mirror (outer mirror) provided to a door panel of a vehicle can be considered An example is seen in Japanese Patent Application Laid-open (JP-A) No. 4-358936.

However, the visor of the door mirror vibrates when it directly receives window during traveling of the vehicle and the vibration is transferred to the loudspeaker and the microphone. Moreover, there are good possibilities that the visor hits another vehicle or a structure other than the vehicle (e.g., a building, and a utility pole) during traveling and that a pedestrian or the like hits the visor even during a stop of the vehicle. A shock applied to the visor by such a hit at another structure or by a person is transferred to the loudspeaker and the microphone.

Such direct and easy transfer of the vibration and shock to the microphone and loudspeaker may cause a break in wiring (lead wire) to the loudspeaker and the microphone in some cases. As a result, the loudspeaker and the microphone may not be able to perform their essential functions.

SUMMARY OF THE INVENTION

With the above facts in mind, it is an object of the present invention to obtain an outer mirror which has a function of outputting sound to an outside of a cabin of a vehicle or inputting sound on the outside of the cabin of the vehicle, which is resistant to vibrations and shocks, and which can satisfactorily perform the above function for a long time. Furthermore, it is another object of the invention to obtain a vehicle interphone which has such a function of inputting the sound and is shock resistant.

According to a first aspect of the invention, there is provided an outer mirror comprising: a support portion directly or indirectly mounted to a vehicle body outside a cabin of a vehicle to support a reflecting mirror; a visor formed in a concave shape open toward a reflecting surface of the reflecting mirror to accommodate at least a part of the support portion and the reflecting mirror in the visor; and an acoustic transducer which is fixed to the support portion, to which at least one of an electric signal and a sound is input, and which transduces the one of the electric signal and the sound into the other to output the other according to a level of the one.

With the outer mirror having the above structure, the reflecting mirror is mounted to the support portion directly or indirectly fixed outside the cabin of the vehicle. It is possible to visually recognize a direction of incidence of light on the reflecting mirror, e.g., the rear of the vehicle by seeing the reflecting surface of the reflecting mirror from inside the cabin of the vehicle.

As least a part of the support portion and the reflecting mirror are accommodated in the visor in the concave shape (i.e., the bowl shape or the box shape) open toward the reflecting surface of the reflecting mirror. Therefore, if the outer mirror includes driving means for changing a direction of the reflecting surface of the reflecting mirror mounted to the support portion with a driving force and a driving force transferring mechanism for transferring the driving force, for example, the driving means and the driving force transferring mechanism are accommodated in the visor.

As a result, it is possible to prevent or alleviate adhesion of water or the like to the driving means and the driving force transferring mechanism when it is rainy or during washing of the car.

In this outer mirror, the acoustic transducer is provided in the visor. If at least one of the electric signal and the sound is input to the acoustic transducer, the one is transduced into the other of the electric signal and the sound according to the level of the one and is output.

Therefore, if the one is the electric signal and the other is the sound, the sound is output from the vicinity of the visor. On the other hand, if the one is the sound (or voice) and the other is the electric signal, when the sound near the visor is input to the acoustic transducer, the sound is transduced into the electric signal and input to the interior loudspeaker or the like in the cabin of the vehicle, for example.

As a result, if the sound input to the interior microphone provided in the cabin of the vehicle is transduced into the electric signal and the electric signal is further transduced into the sound by the acoustic transducer, for example, it is possible to speak to a person or the like on the outside of the cabin from inside the cabin of the vehicle while keeping the window closed. If the electric signal transduced based on the sound input to the acoustic transducer is further transduced into the sound by the interior loudspeaker (e.g., a loudspeaker of a vehicle audio system) provided in the cabin of the vehicle, for example, it is possible to hear the sound or the like of the person on the outside of the cabin of the vehicle while keeping the window closed.

In this outer mirror, the acoustic transducer is fixed to the support portion. Because the support portion is a portion where the reflecting mirror is mounted and which is directly or indirectly mounted to the vehicle body as described above, the support portion has higher rigidity than the visor and the like. As a result, the acoustic transducer is reliably supported.

If the visor receives a shock when the visor hits another vehicle or a structure other than the vehicle (e.g., a utility pole, a wall, a building) during traveling of the vehicle or when a pedestrian hits the visor during a stop of the vehicle, the shock is less liable to be transferred to the acoustic transducer because the acoustic transducer is mounted not to the visor but to the support portion. As a result, it is possible to alleviate or prevent breakage or failure of the acoustic transducer to allow the acoustic transducer to operate satisfactorily for a long time.

Normally, the support portion is directly or indirectly mounted to the vehicle body, while the visor is mounted to the support portion after the support portion is mounted to the vehicle body. Therefore, in the invention in which the acoustic transducer is mounted to the support portion, it is possible to carry out wiring to the acoustic transducer before the visor is mounted to the support portion, which facilitates assembly of the outer mirror.

Moreover, because the acoustic transducer is mounted to the support portion having higher rigidity than the visor, it is possible to alleviate or prevent a break in wiring to the acoustic transducer due to vibrations during traveling or the like of the vehicle.

In the outer mirror of the invention, the acoustic transducer may include an exterior loudspeaker which transduces the input electric signal into the sound according to a signal level of the electric signal to output the sound and the sound from which is output mainly toward a bottom portion of the visor.

In the outer mirror having the above structure, if the electric signal is input to the exterior loudspeaker forming the acoustic transducer, the input electric signal is transduced into the sound according to the signal level of the electric signal and output by the exterior loudspeaker.

As a result, the sound can be output in the vicinity of the outer mirror of the vehicle, e.g., in the vicinity of a door panel corresponding to a driver's sheet or a passenger's sheet of the vehicle if the outer mirror is mounted to the door panel.

Although the sound is mainly output from the exterior loudspeaker toward the bottom portion of the visor in the invention, an output direction of the sound may spread about the direction toward the bottom portion of the visor as a matter of course.

In the outer mirror of the invention, an interior microphone which is provided in the cabin of the vehicle, to which the sound is input, and which transduces the input sound into the electric signal according to a level of the sound may be connected to the acoustic transducer to output the electric signal output from the interior microphone to the acoustic transducer.

In the outer mirror having the above structure, the interior microphone provided in the cabin of the vehicle is connected to the acoustic transducer. The sound input to the interior microphone is transduced into the electric signal according to the level of the sound. If the electric signal is input to the acoustic transducer, the electric signal is transduced into the sound according to the signal level of the electric signal and output by the acoustic transducer.

As a result, while keeping the window and the door panel of the vehicle closed, it is possible to speak to a person or the like on the outside of the vehicle and particularly in the vicinity of the outer mirror of the vehicle, e.g., in the vicinity of the door panel corresponding to the driver's sheet or the passenger's sheet of the vehicle if the outer mirror is mounted to the door panel.

In the outer mirror of the invention, in addition to any one of the above-described features, the acoustic transducer may include an exterior microphone to which the sound is input mainly toward a bottom portion of the visor, which transduces the input sound into the electric signal according to a level of the sound to output the sound. An interior loudspeaker provided in the cabin of the vehicle to transduce the input electric signal into sound according to a signal level of the electric signal to output the sound in the cabin of the vehicle may be connected to the acoustic transducer and the electric signal output from the exterior microphone may be output to the interior loudspeaker.

In the outer mirror having the above structure, if the sound is input to the exterior microphone forming the acoustic transducer, the input sound is transduced into the electric signal according to the level of the sound and output by the exterior microphone.

The acoustic transducer is connected to the interior loudspeaker provided in the cabin of the vehicle and the electric signal output from the exterior microphone of the acoustic transducer is input to the interior loudspeaker. The electric signal input to the interior loudspeaker is transduced into the sound according to the signal level of the electric signal and output from the interior loudspeaker.

As a result, while keeping the window and the door panel closed, it is possible to hear the sound outside of the cabin of the vehicle in the cabin of the vehicle.

Although the sound is input to the interior microphone mainly toward the bottom portion of the visor in the invention, the input direction of the sound may spread about the direction toward the bottom portion of the visor as a matter of course.

In the outer mirror of the invention, the acoustic transducer may be waterproof.

In the outer mirror having the above structure, because the acoustic transducer is made waterproof, it is possible to alleviate or prevent failure or the like of the acoustic transducer due to adhesion of water or the like even if the water or the like enters the visor during washing of the car, for example.

According to a second aspect of the invention, there is provided a vehicle interphone comprising an interior microphone, an interior loudspeaker, and an acoustic transducer. The interior microphone is provided in a cabin of a vehicle to transduce an input sound into an electric signal according to a level of the sound and to output the electric signal. The interior loudspeaker provided in the cabin of the vehicle to transduce an input electric signal into a sound according to a level of the electric signal and to output the sound. The acoustic transducer is fixed to a support portion to face a side opposite to the reflecting mirror. The support portion is directly or indirectly mounted to a vehicle body outside the cabin of the vehicle for supporting a reflecting mirror. At least a part of the support portion is accommodated in a visor in a concave shape open toward a reflecting surface of the reflecting mirror. The transducer transduces the electric signal output from the interior microphone into a sound according to a level of the electric signal to output the sound.

Sound outside of the cabin of the vehicle is input to the transducer. The transducer transduces the input sound into an electric signal according to a level of the sound to output the electric signal to the interior loudspeaker.

In the vehicle interphone having the above structure, if the sound is input to the interior microphone provided in the cabin of the vehicle, the sound is transduced into the electric signal according to the level of the input sound and output by the interior microphone. The electric signal output from the interior microphone is input to the acoustic transducer mounted to the outer mirror on the outside of the cabin of the vehicle. By the acoustic transducer, the input electric signal is transduced into the sound according to the signal level of the electric signal and output.

As a result, while keeping the window and the door panel of the vehicle closed, it is possible to hear the sound in the cabin of the vehicle in the vicinity of the outer mirror on the outside of the cabin of the vehicle.

If the sound is input to the above acoustic transducer, the sound is transduced into the electric signal according to the level of the sound and output by the acoustic transducer.

The electric signal output from the acoustic transducer is input to the interior loudspeaker provided in the cabin of the vehicle and transduced into the sound according to the signal level of the electric signal and output by the interior loudspeaker.

As a result, while keeping the window and the door panel of the vehicle closed, it is possible to hear the sound on the outside of the cabin of the vehicle and particularly in the vicinity of the outer mirror in the cabin of the vehicle.

As described above, according to the invention, a smooth conversation is possible between persons in and on the outside of the cabin of the vehicle while keeping the window and the door panel closed.

In the vehicle interphone, the acoustic transducer is fixed to the support portion for supporting the reflecting mirror of the outer mirror. Because the support portion is a portion where the reflecting mirror is mounted and which is directly or indirectly mounted to the vehicle body, the support portion has higher rigidity than the visor and the like for accommodating the reflecting mirror and the support portion. As a result, the acoustic transducer is reliably supported.

Moreover, if the visor receives a shock when the visor hits another vehicle or a structure other than the vehicle (e.g., a utility pole, a wall, and a building) during traveling of the vehicle or when a pedestrian hits the visor during a stop of the vehicle, the shock is less liable to be transferred to the acoustic transducer because the acoustic transducer is mounted not to the visor but to the support portion. As a result, it is possible to alleviate or prevent breakage or failure of the acoustic transducer to allow the acoustic transducer to operate satisfactorily for a long time.

Normally, the support portion is directly or indirectly mounted to the vehicle body, while the visor is mounted to the support portion after the support portion is mounted to the vehicle body. Therefore, in the invention in which the acoustic transducer is mounted to the support portion, it is possible to carry out wiring to the acoustic transducer before the visor is mounted to the support portion, which facilitates assembly of the outer mirror.

Moreover, because the acoustic transducer is mounted to and supported on the support portion having higher rigidity than the visor, it is possible to alleviate or prevent a break in wiring to the acoustic transducer due to vibrations during traveling or the like of the vehicle.

In the invention, the acoustic transducer may be a single structure for carrying out both output and input of the sound or may be formed of the exterior loudspeaker and the exterior microphone as separate bodies.

The vehicle interphone of the invention may further comprise a switching device for switching the acoustic transducer between a sound output-capable state in which the electric signal from the interior microphone can be transduced into the sound and output and a sound input-capable state in which the sound input to the acoustic transducer can be transduced into the electric signal and output to the interior loudspeaker.

In the vehicle interphone having the above structure, if the switching device switches to the sound output-capable state and the sound is input to the interior microphone in this state, the input sound is transduced into the electric signal and output by the interior microphone and the electric signal is transduced into the sound and output by the acoustic transducer.

If the switching device switches to the sound input-capable state and the sound is input to the acoustic transducer in this state, the input sound is transduced into the electric signal and output by the acoustic transducer. The electric signal is transduced into the sound and output by the interior loudspeaker.

As described above, because the vehicle interphone has such a structure that the switching device switches between the state in which the sound can be output from the acoustic transducer and the state in which the sound can be input to the acoustic transducer, the acoustic transducer can basically be a single structure. In other words, there is no need to separate the structure of the acoustic transducer into the exterior loudspeaker and the exterior microphone.

Therefore, a cost is reduced and the acoustic transducer can be disposed in the visor which is a narrow and limited space without forcibly miniaturizing the structure of the acoustic transducer.

BRIEF DESCRIPTION OF THE DRAWINGS

FIG. 3 is a block diagram of a general system of the outer mirror (vehicle interphone) according to the embodiment of the invention.

DETAILED DESCRIPTION OF THE EMBODIMENT

Structure of the Embodiment

Figure 2:
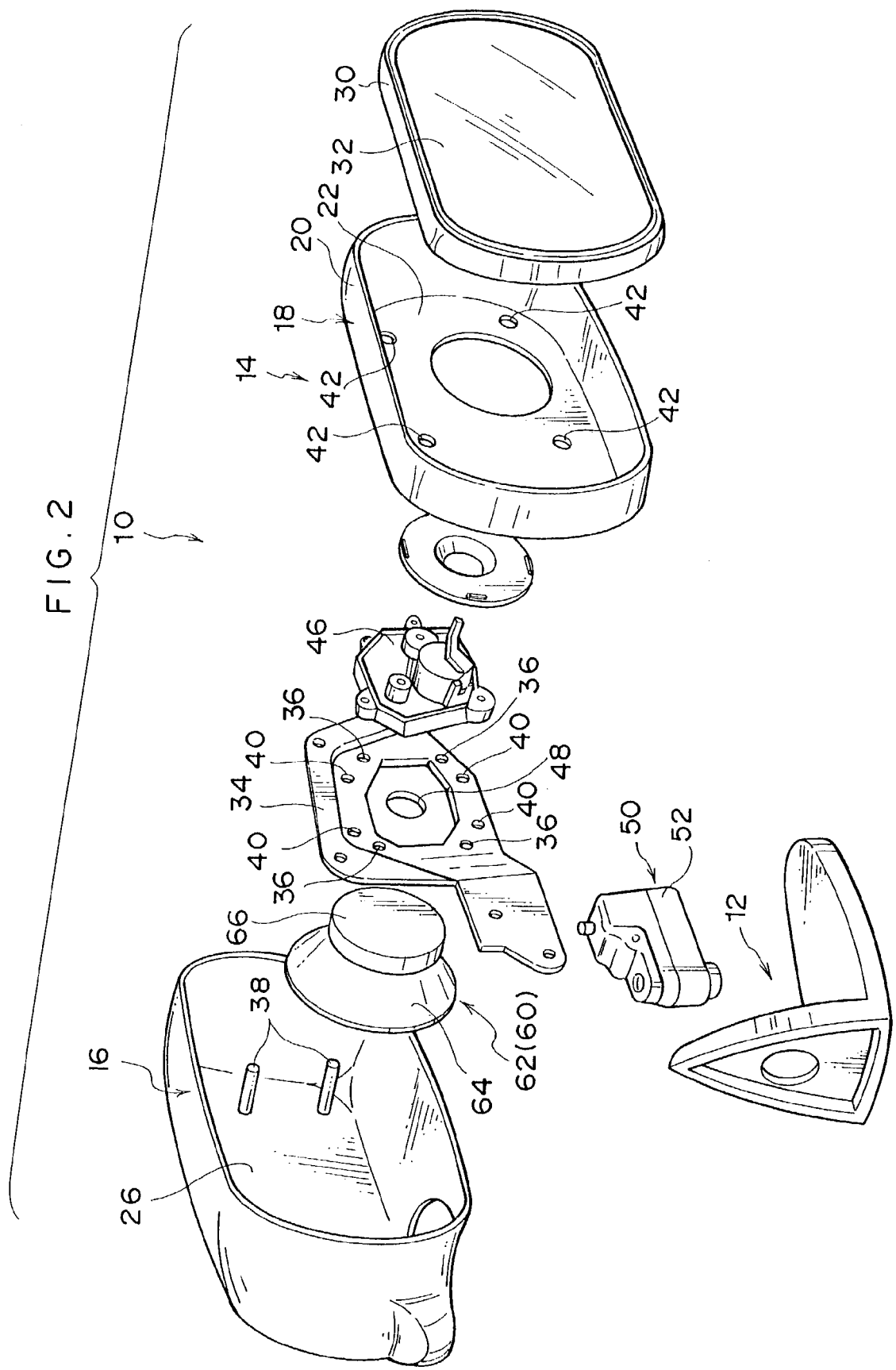
FIG. 2 is an exploded perspective view of a general structure of the outer mirror (vehicle interphone) according to the embodiment of the invention.

FIG. 2 is an exploded perspective view of a general structure of a door mirror device 10 as an outer mirror according to an embodiment of the present invention.

As shown in this drawing, the door mirror device 10 includes a door mirror base 12. The door mirror base 12 is mounted to a corner portion of a door panel provided to a vehicle body to correspond to a doorway for getting on and off of the vehicle on each of opposite sides in a vehicle width direction. The door mirror base 12 is mounted with a door mirror main body 14 for rotation about a predetermined axis if a vertical direction of the vehicle is assumed to be an axial direction.

The door mirror main body 14 includes a visor cover 16 forming a visor. The visor cover 16 is made of synthetic resin material in a box shape or a bowl shape which is open toward a rear side of the vehicle when the door mirror device 10 is used. At an opening end of the visor cover 16, a rim portion 20 of a visor rim 18 forming the visor together with the visor cover 16 is mounted. The rim portion 20 is formed into an annular shape corresponding to a peripheral edge of an opening end of the visor cover 16 and can be fitted with the peripheral edge of the opening end of the visor cover 16.

Figure 1:
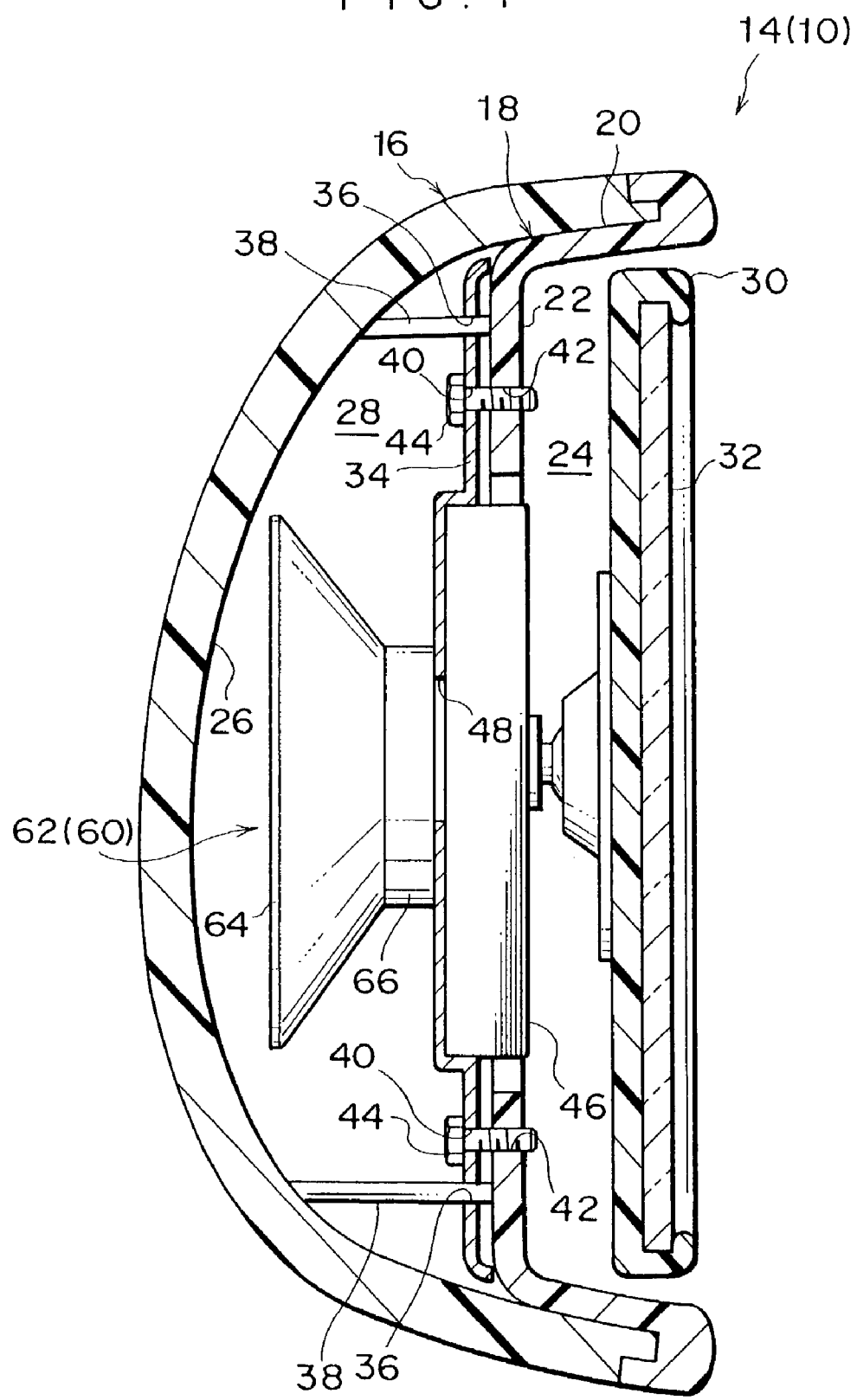
FIG. 1 is a sectional view of a structure of an essential portion of an outer mirror (vehicle interphone) according to an embodiment of the present invention.

The visor rim 18 has a partition 22. The partition 22 is formed to be successive from the rim portion 20 and the visor rim 18 is formed of the rim portion 20 and the partition 22 into a dish shape or a bowl shape on the whole, the shape being shallower than the visor cover 16. As shown in FIG. 1, the visor rim 18 partitions an inside space of the visor cover 16 into a mirror body disposing portion 24 on a side of the opening end of the visor cover 16 and a driveline disposing portion 28 on a side of a bottom portion 26 with the rim portion 20 fitting with the opening end of the visor cover 16 and the partition 22 entering the visor cover 16.

As shown in FIG. 1, a mirror holder 30 is disposed in the mirror body disposing portion 24. The mirror holder 30 is formed into an annular shape having a frame portion or a shallow dish shape in which the flame portion is integrally formed with a plate-shaped base portion. An outer peripheral portion of a mirror body 32 as a reflecting mirror is integrally retained on the frame portion of the mirror holder 30.

The mirror body 32 is formed of a transparent plate-shaped member (e.g., a glass plate) with its thickness direction along an opening direction of the visor cover 16. Out of opposite faces in the thickness direction of the mirror body 32, the face positioned on the side of the bottom portion 26 of the visor cover 16 is formed with a reflecting film and reflects light incident from the opening end side of the visor cover 16 according to an angle of incidence.

In the driveline disposing portion 28, a frame 34 as a support portion is provided. The frame 34 is formed of metal material or synthetic resin material into a flat plate shape or a disc shape on the whole with its thickness direction along the opening direction and an opposite direction to the opening direction of the visor cover 16. The frame 34 is formed with a plurality of fitting holes 36 and fitting projections 38 formed to project from the bottom portion 26 of the visor cover 16 enter and are fitted in the corresponding fitting holes 36 to thereby mechanically connect the visor cover 16 to the frame 34. The frame 34 is formed with a plurality of through holes 40. The through holes 40 are formed to correspond to through holes 42 formed in the partition 22 of the visor rim 18 and the visor rim 18 and the frame 34 are mechanically connected by bolts 44 passing through the through holes 40 and 42.

Furthermore, as shown in FIGS. 1 and 2, the frame 34 is mounted with a mirror body driving unit 46. The mirror body driving unit 46 is formed of a pair of motors (not shown) and a speed reducing mechanism such as a reduction gear for reducing a speed of a driving force of each the motor. To the mirror body driving unit 46, the mirror holder 30 is mechanically connected through a hole portion 48 formed in the partition 22 of the visor rim 18. When one of the pair of motors is driven, the mirror holder 30 retaining the mirror body 32 rotates about a predetermined axis in the vertical direction of the vehicle. When the other of the pair of motors is driven, the mirror holder 30 rotates about a predetermined axis in a direction orthogonal to both the vertical direction of the vehicle and the opening direction of the visor cover 16. By such rotation of the mirror holder 30, it is possible to appropriately change a reflecting direction of light by the mirror body 32.

As shown in FIG. 2, an electric accommodating unit 50 is provided on a side of the frame 34. The electric accommodating unit 50 includes a base member and a case 52 including a cover rotatable with respect to the base portion and about a predetermined axis in the vertical direction of the vehicle. The frame 34 is fixed to a cover of the case 52 and the base member is fixed to the door mirror base 12. In the case 52, the motors and a driving force transferring mechanism formed of a gear and the like (not shown) are accommodated and the cover and the frame 34 mounted to the cover are rotated with respect to the base member by the driving force of the motors.

As shown in FIG. 1, inside the visor cover 16, a microphone-loudspeaker 62 forming an acoustic transducer as an exterior microphone and an exterior loudspeaker and forming a vehicle interphone 60 is fixed to the frame 34. The microphone-loudspeaker 62 has a conical main body 64 with its axial direction being in the opening direction of the visor cover 16.

The main body 64 is mounted with a vibrating body such as a diaphragm and a vibrating film (not shown). When the microphone-loudspeaker 62 is used as the exterior loudspeaker, the vibrating body vibrates to thereby generate sound from the main body 64 toward the bottom portion 26 of the visor cover 16. When the microphone-loudspeaker 62 is used as the exterior microphone, sound or voice from outside, especially from the side of the bottom portion 26 of the visor cover 16, is transferred to the vibrating body to thereby vibrate the vibrating body according to frequency and other properties of the sound. The vibrating body is subjected to waterproofing treatment such as a waterproofing coating such that the vibrating body can be prevented from absorbing rainwater or the like even if the rainwater or the like adheres to the vibrating body to prevent generation of deformation, a wrinkle, bending due to the absorption of the rainwater or the like.

The microphone-loudspeaker 62 includes a transducing portion 66. As shown in a block diagram in FIG. 3, The transducing portion 66 is electrically connected to the main body 64 and is electrically connected to an input port and an output port of an amplifier 68 provided in the cabin of the vehicle. Between the amplifier 68 and the transducing portion 66, a changeover switch 70 is disposed. Through the changeover switch 70, the input port of the amplifier 68 is electrically connected to an interior microphone 72 provided to a steering wheel, a back face side of a driver's seat, or the like.

To the changeover switch 70, an interior loudspeaker 76 forming a vehicle audio system 74 is electrically connected. The interior loudspeaker 76 is electrically connected to the output port of the amplifier 68 through the changeover switch 70.

By a changeover operation (switching operation), the changeover switch 70 can switch between a sound output-capable state in which the interior microphone 72 and the input port of the amplifier 68, the transducing portion 66 and the output port of the amplifier 68 are respectively and electrically connected and respective electric connections of the transducing portion 66 with the input port of the amplifier 68 and the interior loudspeaker 76 with the amplifier 68 are cancelled and a sound input-capable state in which the transducing portion 66 and the input port of the amplifier 68, the interior loudspeaker 76 and the output port of the amplifier 68 are respectively and electrically connected and respective electric connections of the transducing portion 66 with the output port of the amplifier 68 and the interior microphone 72 with the input port of the amplifier 68 are cancelled.

Operations and Effects of the Embodiment

In this door mirror device 10, if a mirror accommodating switch (not shown) provided in a predetermined position in the cabin of the vehicle is operated to drive the motor of the electric accommodating unit 50, for example, the frame 34 rotates about the predetermined axis in the vertical direction of the vehicle and, as a result, the visor cover 16, the visor rim 18, the mirror holder 30, and the mirror body 32 rotate. By such rotation of the frame 34, it is possible to visually recognize a rear of the vehicle with the mirror body 32 by orienting a reflecting surface of the mirror body 32 toward the rear of the vehicle at a start of traveling of the vehicle. When the vehicle is parked, by rotating the frame 34 to orient the reflecting surface of the mirror body 32 toward an inside of the cabin in the width direction of the vehicle to rotate the visor cover 16, a dimension of the visor cover 16 along the width direction of the vehicle can be reduced.

By operating an adjusting switch (not shown) provided in a predetermined position in the cabin of the vehicle when the reflecting surface of the mirror body 32 is oriented toward the rear of the vehicle, the pair of motors provided to the mirror body driving unit 46 are driven appropriately to rotate the mirror body 32 with respect to the frame 34. As a result, a reflecting direction of light by the mirror body 32 can be changed.

In this door mirror device 10 (this vehicle interphone 60), if the changeover switch 70 is operated to connect the transducing portion 66 to the input port of the amplifier 68 and to connect the interior loudspeaker 76 to the output port of the amplifier 68, the respective electric connections of the transducing portion 66 with the output port of the amplifier 68 and the interior microphone 72 with the input port of the amplifier 68 are cancelled (i.e., sound can be input).

If sound on the outside of the cabin of the vehicle and particularly in a vicinity of the visor cover 16 is input to the main body 64 of the microphone-loudspeaker 62 in this state, the vibrating body of the main body 64 vibrates according to a frequency and the like of the input sound and vibration of the vibrating body is input to the transducing portion 66. An electric signal according to a vibration level of the vibrating body is output from the transducing portion 66 and is input to the amplifier 68 from the input port. By the amplifier 68, the electric signal is appropriately amplified or noise or the like in the electric signal is cut and the electric signal is output from the output port and input to the interior loudspeaker 76. The interior loudspeaker 76 to which the electric signal from the amplifier 68 is input outputs sound according to a signal level of the electric signal. As a result, it is possible to hear the sound on the outside of the cabin of the vehicle in the cabin of the vehicle.

If the changeover switch 70 is operated to connect the transducing portion 66 to the output port of the amplifier 68 and to connect the interior microphone 72 to the input port of the amplifier 68, the respective electric connections of the transducing portion 66 with the input port of the amplifier 68 and the interior loudspeaker 76 with the output port of the amplifier 68 are cancelled (i.e., sound can be output).

If sound in the cabin of the vehicle is input to the interior microphone 72 in this state, an electric signal according to a level of frequency or the like of the input sound is output from the interior microphone 72 and is input to the amplifier 68 from the input port. By the amplifier 68, the electric signal is appropriately amplified or noise or the like in the electric signal is cut and the electric signal is output from the output port and input to the transducing portion 66. The transducing portion 66 vibrates the vibrating body of the main body 64 according to a signal level of the electric signal from the amplifier 68. As a result, sound is generated from the main body 64 toward the bottom portion 26 of the visor cover 16. As a result, it is possible to hear the sound in the cabin of the vehicle in a vicinity of the visor cover 16 on the outside of the cabin of the vehicle.

As described above, according to the embodiment, because it is possible to hear the sound on the outside of the cabin of the vehicle in the cabin of the vehicle and to hear the sound in the cabin of the vehicle outside the cabin of the vehicle through the microphone-loudspeaker 62, persons in and on the outside of the cabin of the vehicle can have a conversation with each other while keeping a door panel and a window of the vehicle closed. As a result, a passenger can check whether a person on the outside of the cabin of the vehicle intends to do harm to the passenger by having a conversation with the person while keeping the window and the door panel closed when the person speaks to the passenger.

In the embodiment, the microphone-loudspeaker 62 is fixed to the frame 34 as described above. Because the frame 34 is a portion mounted to the vehicle body through the electric accommodating unit 50 and the door mirror base 12, the frame 34 has higher rigidity than the visor cover 16, the visor rim 18, and the like. Therefore, the microphone-loudspeaker 62 is supported reliably.

If the visor cover 16 receives a shock when the visor cover 16 hits another vehicle or a structure other than the vehicle (e.g., a utility pole, a wall, a building) during traveling of the vehicle or when a pedestrian hits the visor cover 16 during a stop of the vehicle, the shock is less liable to be transferred to the microphone-loudspeaker 62 because the microphone-loudspeaker 62 is mounted not to the visor cover 16 but to the frame 34. As a result, it is possible to alleviate or prevent breakage or failure of the microphone-loudspeaker 62 to allow the microphone-loudspeaker 62 to operate satisfactorily for a long time.

Normally, the frame 34 is mounted to the vehicle body through the electric accommodating unit 50 and the door mirror base 12, while the visor cover 16 is mounted to the frame 34 after the frame 34 is mounted to the vehicle body. Therefore, in the embodiment in which the microphone-loudspeaker 62 is mounted to the frame 34, it is possible to carry out wiring to the microphone-loudspeaker 62 before the visor cover 16 is mounted to the frame 34, which facilitates assembly of the door mirror device 10.

Moreover, because the microphone-loudspeaker 62 is mounted to and supported on the frame 34 having higher rigidity than the visor cover 16, it is possible to alleviate or prevent a break in wiring to the microphone-loudspeaker 62 due to vibrations during traveling or the like of the vehicle.

In the embodiment, because the vibrating body of the microphone-loudspeaker 62 is made waterproof, it is possible to alleviate or prevent failure of the microphone-loudspeaker 62 due to adhesion of water or the like to the vibrating body even if the water or the like enters the visor cover 16 during washing of the car, for example.

Furthermore, in the embodiment, because a changeover operation (switching operation) of the changeover switch 70 switches between a state in which sound can be output from the microphone-loudspeaker 62 and a state in which sound can be input to the microphone-loudspeaker 62, the microphone-loudspeaker 62 may be basically formed as a single structure. Accordingly, there is no need to separate the structure of the microphone-loudspeaker 62 into an exterior loudspeaker and an exterior microphone.

Therefore, a cost is reduced and the microphone-loudspeaker 62 can be disposed in the visor cover 16 which is a narrow and limited space without forcibly miniaturizing the structure of the microphone-loudspeaker 62.

Although the sound input to the interior microphone 72 is emitted from the microphone-loudspeaker 62 in the embodiment, the sound to be output from the microphone-loudspeaker 62 is not limited to the sound which has been input to the interior microphone 72. For example, it is possible to store sounds such as "Turning right", "Turning left", and "Backing" in a storage medium in advance and to use the microphone-loudspeaker 62 for emitting the corresponding sound from the microphone-loudspeaker 62 in synchronization with a steering operation or a shifting operation.

For example, it is possible to store vocal phrases such as "The door is locked" and "The door is not locked" which mean whether the door has been locked or not in the storage medium in advance and to use the microphone-loudspeaker 62 for outputting the corresponding sound from the microphone-loudspeaker 62 after a key operation is finished by inserting a key into a key cylinder provided to the door panel of the vehicle.

Furthermore, it is possible to store an alarm sound and a sound asking for a rescue in the storage medium in advance and to use the microphone-loudspeaker 62 for sounding the alarm sound or the sound when an emergency switch provided in a predetermined position in the cabin of the vehicle is operated.

As described above, the invention has a function of emitting the sound to the outside of the cabin of the vehicle or inputting the sound outside of the cabin of the vehicle, is resistant to vibrations and shocks, and can satisfactorily perform the above function for a long time.

What is claimed is:

1. An outer mirror comprising:
    a support portion directly or indirectly mounted to a vehicle body outside a cabin of a vehicle for supporting a reflecting mirror;
    a visor formed in a concave shape open toward a reflecting surface of the reflecting mirror for accommodating at least a part of the support portion and the reflecting mirror therein; and
    an acoustic transducer which is fixed to the support portion, to which at least one of an electric signal and a sound is conducted, and which transduces said one of the electric signal and the sound into a sound and an electric signal, respectively.

2. An outer mirror according to claim 1, wherein the acoustic transducer includes a loudspeaker that transduces the input electric signal into a sound according to a signal level of the electric signal to output the sound, and wherein a bottom portion of the visor includes a sound-conducting opening.

3. An outer mirror according to claim 2, further comprising an interior microphone in the cabin of the vehicle and connected to the acoustic transducer, wherein the interior microphone transduces the input sound into an electric signal according to a level of the sound, and the electric signal output from the interior microphone is conducted to the acoustic transducer.

4. An outer mirror according to claim 1, wherein the acoustic transducer includes a microphone, the visor includes a sound-conducting opening for conducting sound to the microphone mainly from a bottom portion of the visor, and wherein the microphone transduces sound into an electric signal according to a level of the sound; said outer mirror further comprising an interior loudspeaker provided in the cabin of the vehicle to transduce an electric signal from said microphone into a sound according to a signal level of the electric signal.

5. An outer mirror according to claim 4, wherein the acoustic transducer is waterproof.

6. An outer mirror according to claim 1, wherein the visor includes a box-shaped visor cover and a visor rim having a shape corresponding to an opening peripheral edge of the visor cover.

7. An outer mirror according to claim 6, wherein the support portion includes a flat-plate-shaped frame formed with a plurality of fitting holes, and fitting projections provided at the visor cover fit into the fitting holes to mechanically connect the visor cover to the frame.

8. An outer mirror according to claim 6, wherein the acoustic transducer includes a microphone-loudspeaker disposed inside the visor cover and having a conical main body, wherein an axial direction of the main body is aligned with an opening in the visor cover.

9. An outer mirror according to claim 8, wherein the microphone-loudspeaker includes a transducing portion which is disposed adjacent to the main body and electrically connected to the main body.

10. An outer mirror according to claim 1, wherein the visor includes a bowl-shaped visor cover and an annular visor rim corresponding to an opening peripheral edge of the visor cover.

11. An outer mirror according to claim 10, wherein the support portion includes a disc-shaped frame formed with a plurality of fitting holes, and fitting projections provided at the visor cover fit into the fitting holes to mechanically connect the visor cover to the frame.

12. An outer mirror according to claim 10, wherein the acoustic transducer includes a microphone-loudspeaker disposed inside to visor cover having a conical main body, and an axial direction of the main body is aligned with an opening in the visor cover.

13. An outer mirror according to claim 12, wherein the microphone-loudspeaker includes a transducing portion which is disposed adjacent to the main body and electrically connected to the main body.

* * * * *